Aug. 18, 1942.  W. TANN  2,293,087
APPARATUS FOR MAKING DIE CASTINGS
Filed Sept. 10, 1936   7 Sheets-Sheet 4
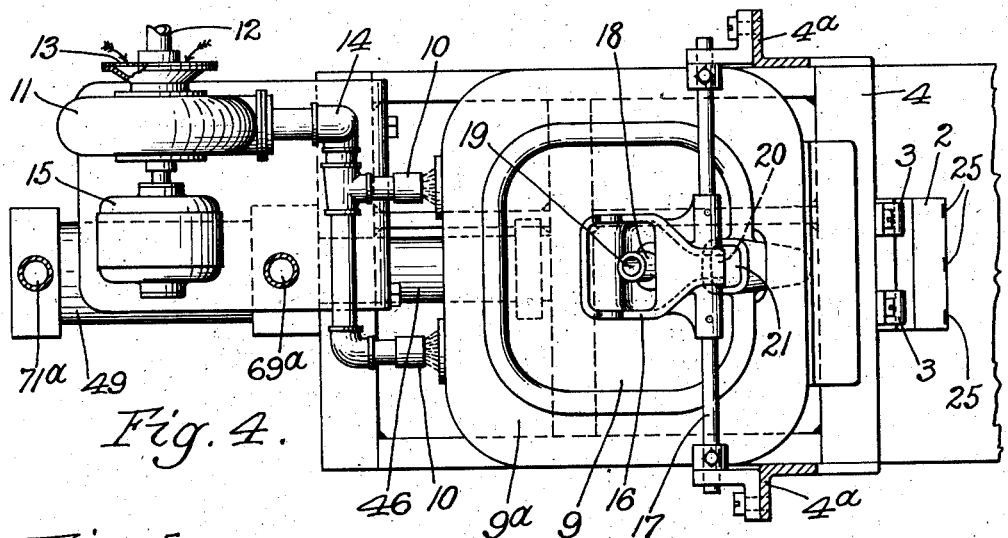
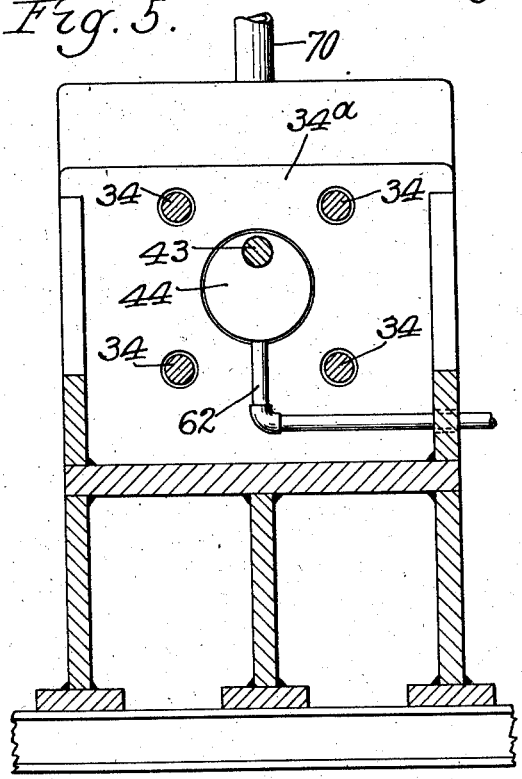
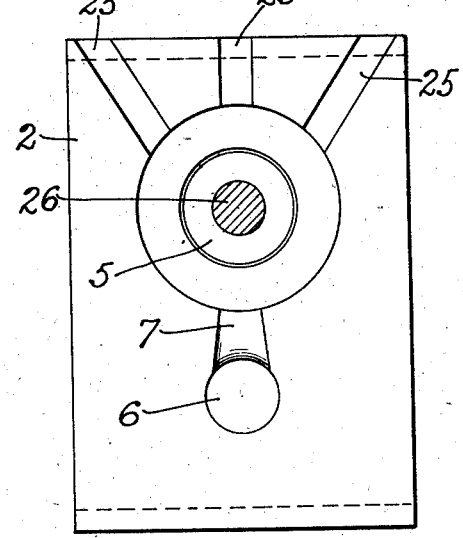
Inventor
William Tann
by Parker & Carter
Attorneys.

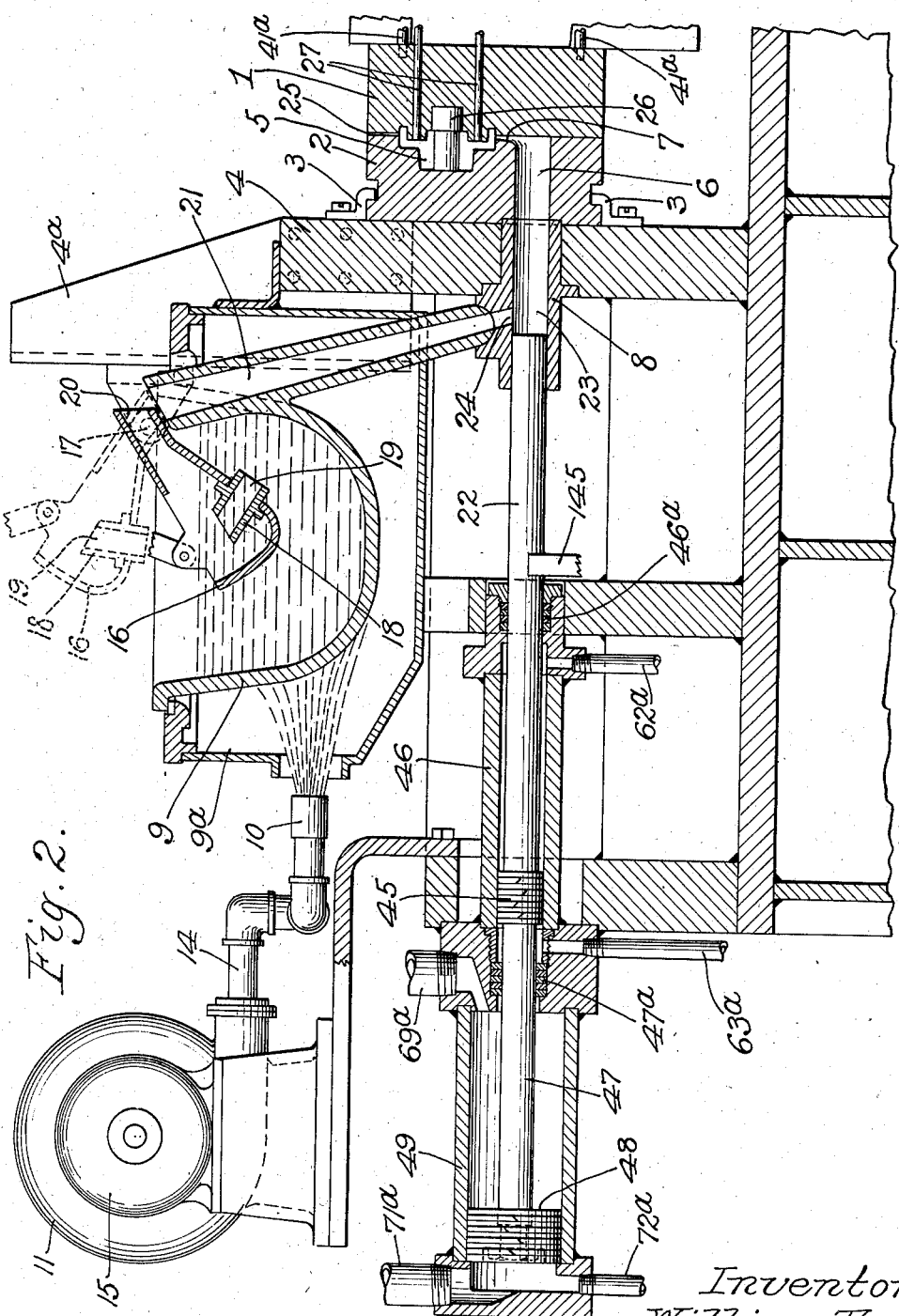

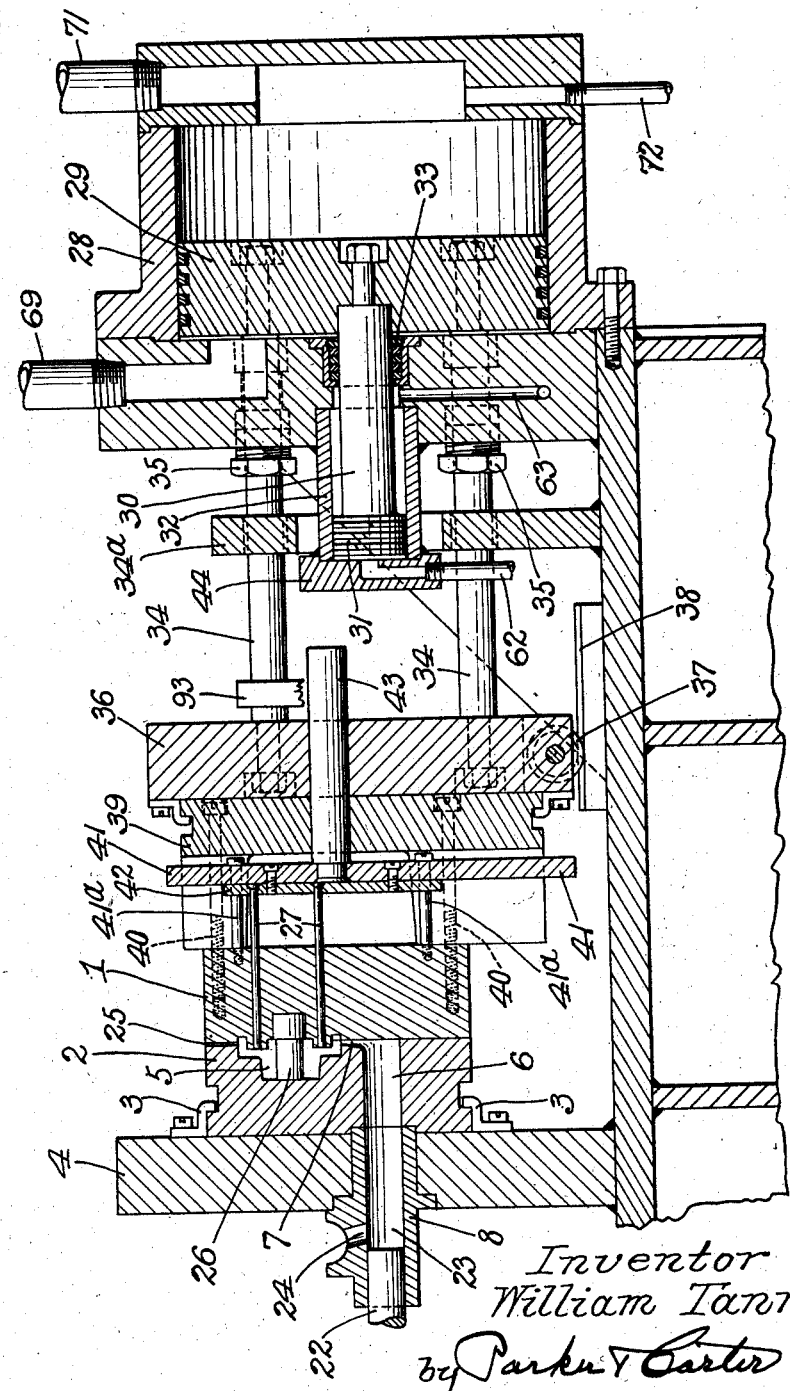

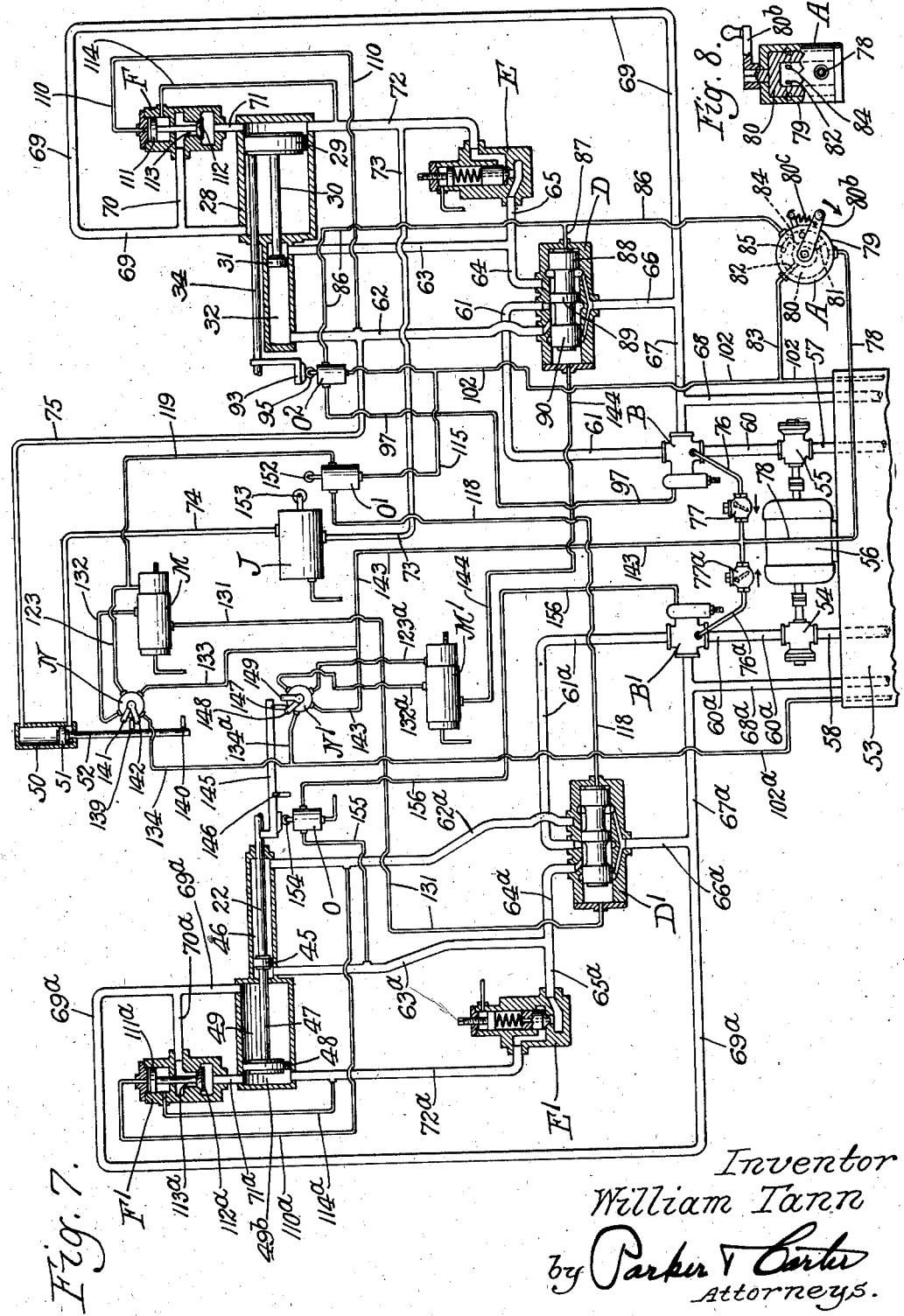

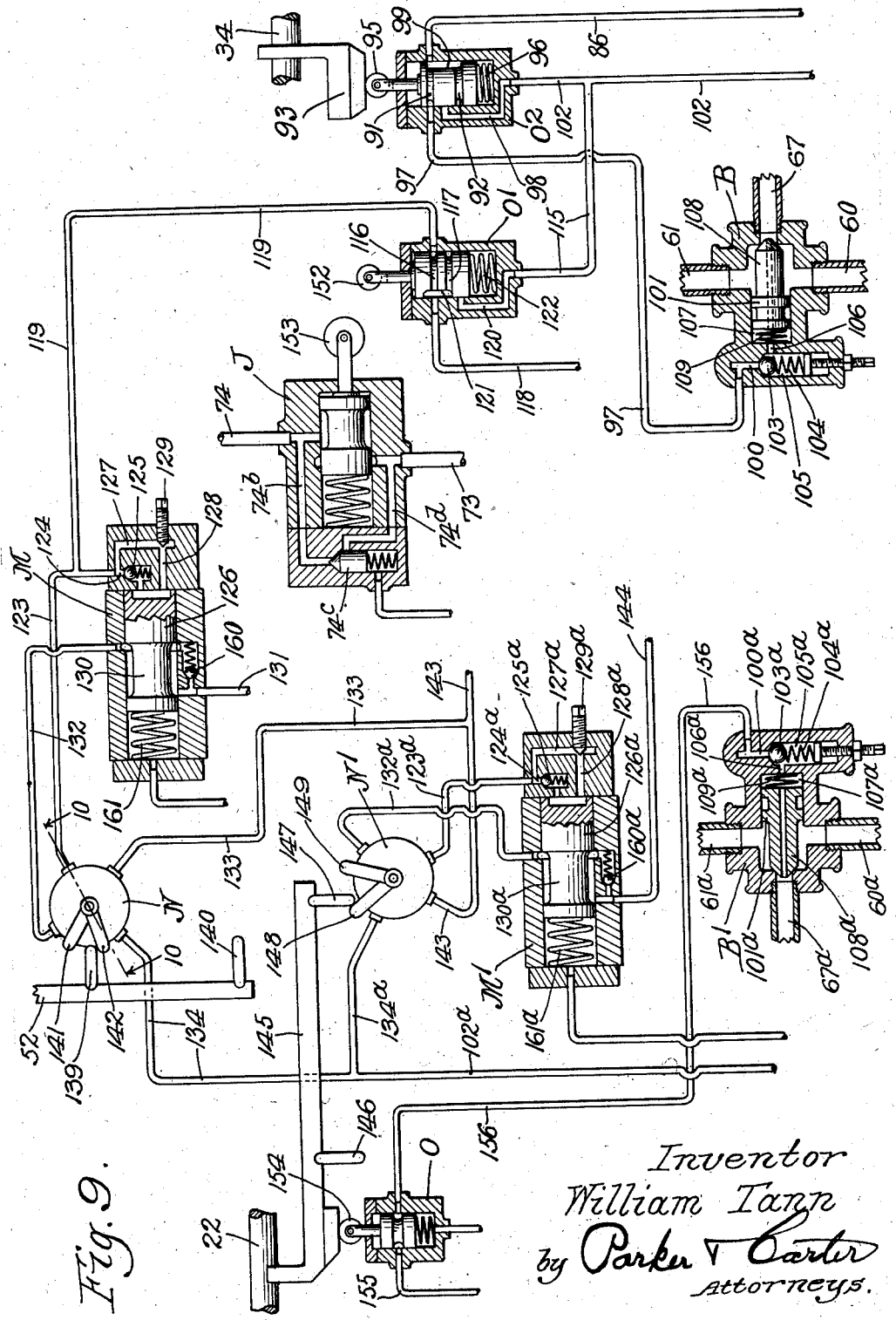

Aug. 18, 1942.  W. TANN  2,293,087
APPARATUS FOR MAKING DIE CASTINGS
Filed Sept. 10, 1936  7 Sheets—Sheet 7
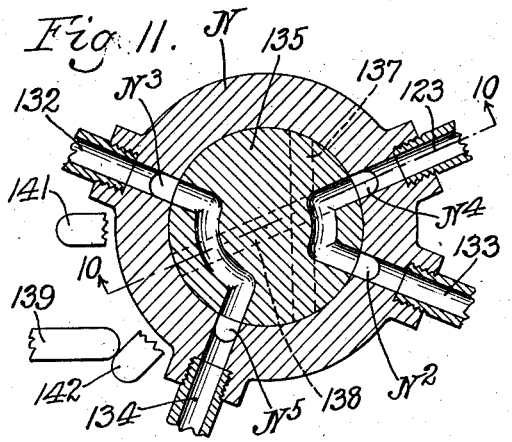
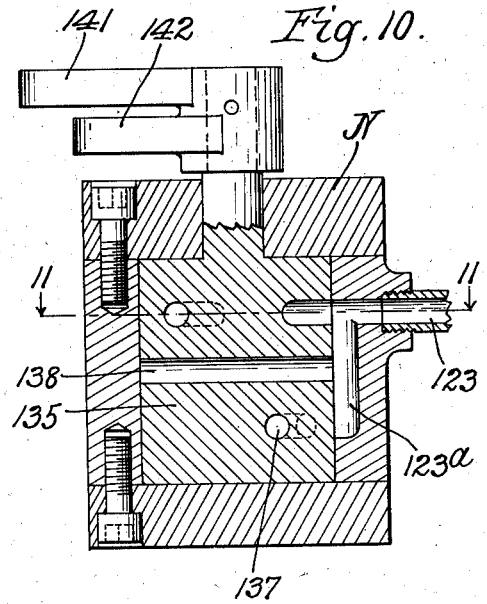
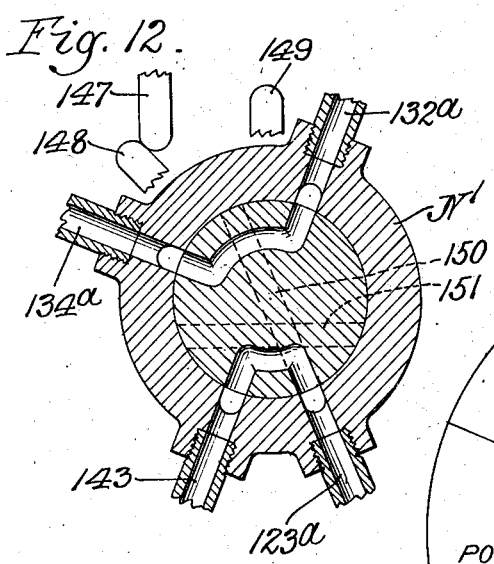
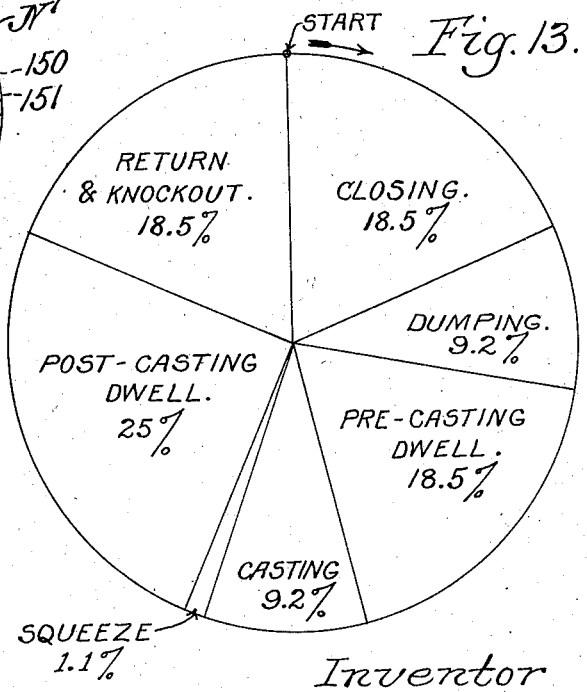
Inventor
William Tann
by Parker & Carter
Attorneys.

Patented Aug. 18, 1942

2,293,087

UNITED STATES PATENT OFFICE 2,293,087

APPARATUS FOR MAKING DIE CASTINGS

William Tann, Detroit, Mich.

Application September 10, 1936, Serial No. 100,154

1 Claim. (Cl. 22—68)

This invention relates to a process and apparatus for making die castings and has for its object to provide a new and improved apparatus of this description.

Heretofore, die castings had gases entrapped in the metal so that they were porous and therefore defective in a number of ways. This porous feature, for example, reduces the strength of the casting and where the casting is plated, the porous sections tend to permit the plating solution to enter and discolor the surface. When the castings are devices which rotate and should therefore necessarily be balanced, the porosity tends to bring about an unbalanced condition in the rotating part. The invention has as a further object to provide a process and apparatus by means of which die castings are made without porosity.

In carrying the invention into practice, the metal is introduced into the mold without the admission of air or other gases and in such a manner as to permit any air that should be in the mold, to escape. This result is accomplished by introducing the metal into the mold at relatively low velocity at the point of junction between the mold and the nozzle through which the metal passes. This introduction of the metal into the mold by a comparatively low velocity prevents the drawing in of air which would otherwise get into the mold and cause porosity of the casting. It also permits the use of the mold at a lower temperature so that none of the components of the metal are converted into gas to cause porosity of the casting, as is the case where the metal is introduced at a higher temperature. Furthermore, when the metal is introduced into the mold at high velocity, this high velocity reduces the pressure and thereby lowers the boiling point of the molten metal, which tends to cause some component parts of the metal to vaporize, thereby causing porosity of the casting.

The invention has as a further object to eliminate the danger of injury to users of the apparatus. The invention has as a further object to provide a process and apparatus of this description by means of which the molten metal cannot be supplied until the die is in proper position to receive it. The invention has as a further object to provide a process and apparatus of this description wherein the die may be moved into proper position without the use of the hand or other part of the person of the operator. The invention has as a further object to provide a process and apparatus of this description by means of which a much better casting than heretofore can be produced and which increases the density of the casting and insure the elimination of objectionable porosity, so as to produce a fine, dense, homogeneous, balanced and strong casting.

The invention has as a further object to provide a device of the kind described, by means of which the molten metal is inserted in the mold by at least two steps, the first step consisting in bringing the charge of molten metal in proximity to the mold by one means, and then inserting it into the mold by another means. The invention has as a further object to provide a device of the kind described, wherein the charge of molten metal is moved into a molding cavity in proximity to the mold and is then forced from the molding cavity into the mold. The invention has other objects which are more particularly pointed out in the accompanying description.

Referring now to the drawings, wherein I have illustrated one form of device embodying the invention, Fig. 1 is a side elevation of a die casting machine, showing the pit underneath;

Fig. 2 is an enlarged longitudinal section of the left-hand portion of Fig. 1;

Fig. 3 is a section similar to Fig. 2, showing the right-hand portion of the device of Fig. 1;

Fig. 4 is a plan view of the portion of the device shown in Fig. 2, with parts in section along the line 4—4 of Fig. 1 with the cylinder support and piston link omitted for clearness;

Fig. 5 is a sectional view along the line 5—5 of Fig. 1;

Fig. 6 is a sectional view along the line 6—6 of Fig. 1, showing the die;

Fig. 7 is a diagrammatic view showing the oil circuit and valve system, with certain of the parts in section to more fully illustrate their operation;

Fig. 8 is a detail, in part section, of the starting valve;

Fig. 9 is a diagrammatic view of a part of the system shown in Fig. 7, but on a larger scale;

Fig. 10 is a detailed section along the line 10—10 of Figs. 9 and 11;

Fig. 11 is a sectional view taken on the line 11—11 of Fig. 10;

Fig. 12 is a section similar to Fig. 11, of the pilot valve operated by the movement of the plunger which moves the charge of metal into the mold; and Fig. 13 is a time diagram showing one arrangement of time allowed for each operation, by means of which satisfactory results can be produced.

Like numerals refer to like parts throughout the several figures.

Figure 1:
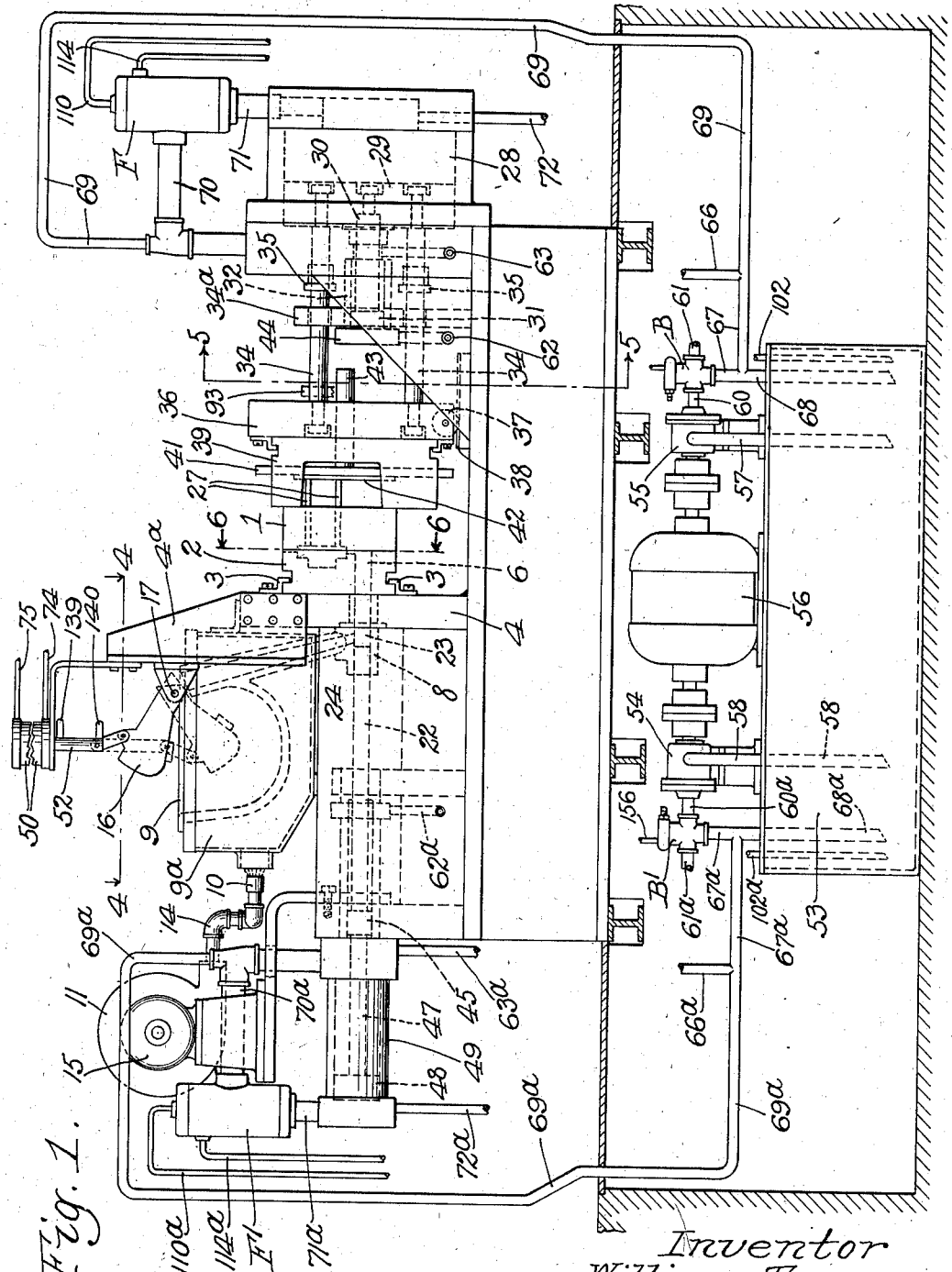

Referring now to the drawings, I have shown one form of die casting apparatus and one form of automatic operating mechanism therefor.

Referring now more particularly to the die casting apparatus, this apparatus consist of a mold in which the material is cast. This mold as herein shown consists of two sections 1 and 2. One of these sections is movable, as for example, the section 1. This section may be moved in any desired manner. The section 2 is preferably stationary and is supported in any desired manner. In the construction shown the section 2 is connected by the members 3 with the support 4. When the sections are brought together, there is formed a metal receiving chamber 5. The member 2 of the mold is provided with a passageway 6 into which the molten metal is introduced. This passageway has a connecting passageway 7 which connects with the metal receiving chamber 5 of the mold. The metal is introduced into the mold, that is the passageway 6, by means of a nozzle 8. This nozzle is comparatively large, that is it has a comparatively large cross-sectional area, being considerably larger than the nozzles now used in introducing the molten metal to the mold.

The molten metal is introduced into the nozzle 8 in any desired manner. I have illustrated a particular and efficient manner of introducing this metal into the nozzle. In this construction I provide a pot 9 containing molten metal. This pot is heated in any desired manner. For the purposes of illustration, I have shown the pot as being heated by the burners 10. When gas is used for the burners, I may provide a blower 11 into which the gas is introduced through the pipe 12. Air is also introduced into the blower through the opening 13 and mixed with the gas and this mixture is directed by the pipe 14 to the burners 10. The blower may be operated by a motor 15.

Associated with the pot 9 is a measuring device, which is illustrated as a ladle 16 pivotally mounted at 17, preferably to the supports 4a. This ladle is provided with a drain member 18 which extends through the bottom thereof and which is provided with a passageway 19 extending therethrough. The ladle is moved down into the pot of molten metal, as illustrated in full lines in Fig. 2, and is then moved up to a position as shown in dotted lines in Fig. 2. Any surplus of molten metal in the ladle runs out through the opening 19 and when the ladle is moved to its discharge position, as shown in dotted lines in Fig. 2, it always contains the same amount of molten metal, so that the charge of molten metal for the mold is always the same. If it is desired to vary the amount of metal introduced into the mold, it is only necessary to vary the height of the drain member 18. When the ladle is moved to its discharge position, the molten metal is discharged through the opening 20 into a conducting member 21 which communicates with the interior of the nozzle 8, so as to discharge the molten metal into such nozzle. The pot and associated parts are preferably removably mounted in a heat chamber 9a.

Some means is provided for moving the molten metal into the metal receiving chamber 5 of the mold. In the construction illustrated I provide a plunger 22 which moves along the passageway 23 in the nozzle and the passageway 6 in the section 2 of the mold. This plunger may be moved in any desired manner and when the charge of metal is introduced into the passageway 23 of the nozzle 8, the plunger is moved forward past the discharge opening 24 and forces the molten metal into the metal receiving chamber 5 of the mold.

The metal is introduced into the mold without the admission of air or other gases and at the same time, permitting the air in the mold to escape. In the device herein illustrated, this is accomplished by introducing the metal into the mold at relatively low velocity at the point of junction between the mold and the nozzle. The reason why the metal can be introduced at this relatively low velocity is because it is introduced into the mold through a larger opening than can now be used. It will be noted that the nozzle 8 has a comparatively large passageway and that it connects with the comparatively large passageway in the section 2 of the mold and that the metal passes from the comparatively large passageway 6 in the mold section 2 through a comparatively small connecting passageway 7 leading to the metal receiving chamber 5. The air in the mold after the metal is introduced therein, escapes through the vent or vents 25. The introduction of the metal into the mold at a comparatively low velocity prevents the drawing in of air with the metal introduced into the mold. It also permits the use of the metal at a lower temperature, as for example from 735° F. to 775° F., whereas heretofore the temperature had to be above 800° F. This low temperature at which the metal is introduced into the mold is of great importance because at this lower temperature, none of the components of the metal are converted into gas, whereas at the higher temperatures heretofore used, some of these components are converted into gas and this gets into the metal in the mold and makes it porous. Furthermore, when the metal is introduced into the mold at high velocity, as has heretofore been the practice, this high velocity reduces the pressure and this lowers the boiling point of the molten metal and the lowering of the boiling point of the molten metal causes some of the component parts of the metal to vaporize, thus forming gas which gets into the mold and makes the casting porous. Another advantage of introucing the molten metal into the mold at a comparatively low velocity is that this prevents turbulence in the mold, thereby preventing the vent from being closed. This insures the escape of all the air in the mold so that there will be no air caught in the molten metal to make it porous.

After the mold is substantially filled with the molten metal under the pressure used in forcing the metal into the metal receiving chamber 5 and when the chamber is substantially filled with metal, increased pressure is applied to the molten metal in the mold as a final step in this part of the process. This final increased pressure on the metal is preferably brought about just as the surface of the metal is solidifying. This final pressure on the molten metal in the mold increases the density of the metal and insures the elimination of all objectionable pososity and insures the production of a fine, dense, homogeneous, balanced and strong cast product.

This final increased pressure on the metal in the mold may be brought about in any desired manner. The mold may be used to form any desired shape, size or form of casting and I have illustrated one form of casting in which the mold is provided with a core 26, this core being attached to the movable section 1 of the mold. After the metal in the mold has solidified, the two members of the mold are operated and the casting removed. In the construction illustrated, the member 1 of the mold is moved away from the member 2 and the casting moves with the member 1. After the member 1 has been moved a sufficient distance the push members 27 are held against movement and they push the casting from the mold section 1, so as to release it.

As previously stated, the die casting mechanism as herein described may be operated in any desired manner, by any desired mechanism. I prefer to provide automatic means for operating it and I have illustrated in the drawings such automatic means, the apparatus being automatically operated hydrostatically. In this operation there is a control valve which is operated, and the operation of this control valve causes the apparatus to automatically go through the cycle of operation as follows.

The section 1 of the mold is moved into operative relation with the stationary section 2 of the mold. The ladle 16 is then moved to introduce a charge of molten metal into the nozzle passageway 23. The plunger 22 is then moved to force the molten metal into the mold under a predetermined pressure and then after the mold is substantially full, the pressure with which the plunger 22 acts upon the molten metal is increased so as to give a final high pressure squeeze to the metal in the mold. The section 1 of the mold is then moved away from the member 2 and the casting pushed from the section 1, the action being properly timed so that all the parts work in proper relation to each other to produce the casting.

In carrying out this automatic operation I provide a large cylinder 28 having a piston 29 to which is connected the piston rod 30 of a small piston 31 which works in a smaller cylinder 32. The piston 30 passes through a stuffing box 33. There is also connected with the large piston 29 a plurality of rods 34 which pass through stuffing boxes 35 and which are connected to a movable member 36. These rods pass through openings in a guide member 34a. This movable member is preferably provided with friction reducing means, such as one or more wheels or rollers 37 working upon the track 38. Attached to the member 36 is a mold section supporting member 39 which supports the mold section 1 in any desired manner, as by means of the threaded supporting members 40. This mold section supporting member is provided at its end near the section 1 of the mold with a vertically extending slot into which is received the member 41 with which the push members 27 are connected. The member 41 is guided on the guide screws 41a. In the construction shown, the push members are directly connected to the piece 42 and this piece is removably connected to the member 41. Connected with the member 41 is an actuating member 43 for the push members 27, which slides in openings in the members 36 and 39 as the mold section 1 is moved away from the mold section 2 and which strikes the stop 44 during this movement. This stops the movement of the member 41 and the push members 27 and produces a relative movement between the push members 27 and the mold section 1, which pushes the casting from the mold section. This is all done automatically as will be hereinafter described.

The plunger 22 which forces the molten metal into the mold is connected with a piston 45 which works in a cylinder 46 which is provided with a stuffing box 46a. The piston 45 is connected by a piston rod 47 with a larger piston 48 which works in a cylinder 49 which is larger than the cylinder 46. The piston rod 47 works in a stuffing box 47a. In the operation of the device, the increased pressure on the molten metal in the mold after the metal receiving chamber 5 is substantially filled, is brought about by means of this large piston 48. This produces an increased pressure on the mold section 1 and this increased pressure is opposed by the large piston 29 in the large cylinder 28.

The ladle 16 is operated by means of a cylinder 50 and a piston 51 which is connected to the ladle by a piston rod 52.

These various pistons may be operated in any desired manner. I have shown one method whereby they are automatically and hydrostatically operated. In this construction I provide a tank 53 containing the liquid by means of which the various parts are operated, this liquid being preferably oil. In view of the fact that there are two sets of cylinders, one for controlling the movable part of the mold and the other for introducing metal into the mold, the pipe connections and the valves are duplicated, one set of pipe connections and valves being for operating the mechanism which controls the mold and the other for operating the mechanism which introduces the metal into the mold. I have shown diagrammatically the system of pipes and control valves in Figs. 7 and 9. For securing pressure and moving the liquid through the pipes, I provide the pumps 54 and 55 operated by the motor 56. Pipes 57 and 58 lead from the pumps into the tank 53 containing the liquid.

Connected in the system is a main control valve A. The system is also provided with two similar relief valves B and B'. There are two similar four-way valves D and D'. There are two similar bypass valves E and E'. There are two similar check-way valves F and F'. There are two similar time delay valves M and M'. There are two similar pilot valves N and N'. There are three similar timing valves O, O' and O².

The pipe connections are divided into two sets, a set of pipes indicated as small pipes which may be called the control pipes, and another set of pipes which are indicated as larger pipes which may be called power pipes, as the liquid passing through them supplies the power to operate the mold and ladle. In describing these pipes, I will describe one set of pipes applying numerals thereto, and the duplicate set of pipes will be provided with the same numerals, with an exponent.

Referring now to the power pipes, the pipe 60 connects pump 55 with the relief valve B. The relief valve B is connected by pipe 61 with the four-way valve D. A pipe 62 connects the four-way valve D with the cylinder 32 which moves section 1 of the mold. A pipe 63 connects cylinder 32 with pipe 64 which connects with the four-way valve D. The pipe 64 is connected to a pipe 65 which connects with the bypass valve E. A pipe 66 connects four-way valve D with a pipe 67 which connects with the relief valve B and the pipe 68 leading to the tank 53. A pipe 69 connected with the pipe 67 connects with one end of the cylinder 28. A pipe 70 connects the pipe 69 with the check-valve F. A pipe 71 connects the check-valve F with the cylinder 28 at the opposite end thereof and a pipe 72 connects this same end of cylinder 28 with the bypass valve E. A pipe 73 connects the pipe 72 with the ladle control valve J and a pipe 74 connects the ladle control valve J with the ladle actuating cylinder 50 on one side of the piston and a pipe 75 connects the cylinder 50 on the other side of the piston with the pipe 62. The duplicate power pipes are given the same reference numerals with the exponent "a."

The bypass valve E has a valve member which is pressed to its seat by an adjustable spring and controls the communication between pipes 65 and 72.

I have shown the power and control pipes diagrammatically in Fig. 7, but it is of course evident that these pipes may be arranged in any desired manner and they are shown diagrammatically in Fig. 7 so that they may be easily designated and followed. For example, in Fig. 7, the pipe 62 is connected with the cylinder 32 at the side thereof. In Fig. 3 I have shown this pipe 62 as being connected to the cylinder 32 at the end thereof. The point of connection is simply a matter of convenience and will be dependent upon the conditions presented.

Referring now to the control pipes, the relief valve B has connected therewith the pipe 76 which connects with the check valve 77, the check valve being connected with pipe 78 which connects with the control valve A. This control valve has a casing 79 with which the various control pipes connect and within the casing is a hollow rotatable control member 80 to which is connected a control handle 80b. This control member has a port 81 which, when the handle 80b is moved in the proper direction, connects with the pipe 78. The control member has another port 82 which connects with the pipe 83. The control member has another port 84. This port 84 has a laterally or circumferentially extending portion 85, so that the port 84 may be connected either with the pipe 78 or the pipe 83. I prefer to provide a construction as herein shown where the control member 80 is hollow and the ports connected therewith, so that the pipes need not be in the same horizontal plane. The port 84 connects with the pipe 86, which in turn is connected by the pipe 87 with the four-way valve D. This four-way valve is provided with three united pistons, 88, 89 and 90 which control the power pipes connected with the valve. When the valve is in the position shown in Fig. 7, the power pipes 61 and 62 are in communication and the power pipes 64 and 66 are in communication. When liquid is admitted through the pipe 87, the pistons are moved toward the other end of the valve and the pipes 61 and 64 are in communication and the pipes 62 and 66 are in communication. The pipe 86 connects with the timing valve O² which is illustrated in section in Fig. 9. This timing valve has a piston provided with two grooves 91 and 92. This piston is moved inwardly by the member 93, connected in any desired manner so as to move with the pistons 29 and 31, as by means of one of the rods 34. As the member 93 moves to the left, it engages the roller 95 and moves the piston inwardly so as to bring pipes 86 and 97 into communication. The piston is moved outwardly by the spring 96 when the roller 95 is released by the member 93. The timing valve O² is provided with a passageway 98, which when the piston is released by the member 93, connects with the groove 92 and by means of the slot 99 in the piston, connects with the pipe 86. The passageway 98 communicates with the pipe 102.

The pipe 97 connects with the passageway 100 in the relief valve B. A valve member 103 closes the end of the passageway 100 and is normally held in its closed position by an adjustable spring 104 in a chamber 105. The chamber 105 is connected by a passageway 106 with a chamber 107. Within the chamber 107 is a valve member 108 which is pressed by a spring 109 against its seat to close the pipe 67. The pipes 60 and 61 are always in communication. When the pressure in the valve chamber becomes sufficient, the valve chamber is opened by the pressure on the enlargement 101, so that pipe 67 communicates with pipes 60 and 61. The pressure of the liquid entering the chamber 105 from pipe 97, when sufficient, acts upon the valve 108 so as to close it again.

A pipe 110 leads from power pipe 62 to the end of the check-way valve F which is provided with a piston 111 to which is attached a valve member 112, adapted to control the port 113 and thus control the connection of pipe 70 to the cylinder 28. When liquid enters the valve F through pipe 110, it moves the piston to open valve member 112. A pipe 114 is connected with the check-way valve F on the other side of the piston 111 from that of the pipe 110 and when liquid from this pipe enters the valve F, it moves the piston 111 to close the valve member 112. A pipe 115 leads from pipe 102 to the timing valve O' which is provided with a piston, see Fig. 9, having the grooves 116 and 117. When the piston is in the position shown in the drawings, the groove 116 connects the pipes 118 and 119. Pipe 118 connects with the end of the four-way valve D'. When the piston is pressed down as hereinafter set out, the groove 117 communicates with the passageway 120, which communicates with the pipe 115 and through the agency of the slot 121 communication is made between the pipes 115 and 118. The piston is returned to its initial position by means of spring 122. The pipe 119 connects with the time delay valve M preferably by being connected with the pipe 123 which connects with a passageway 124, which leads through a spring-pressed valve member 125 to the interior of the time delay valve M at one end of the piston 126, held in its initial position by the spring 161. The passageway 124 communicates with the passageway 127, which in turn communicates with the passageway 128 leading into the time delay valve M at the same end of the piston 126 as the passageway 124. There is an adjustable valve member 129 which controls the connection between the pasasgeways 127 and 128. The piston 126 is provided with an elongated groove 130. When the piston is in its initial position, as shown in Fig. 9, the pipe 131 leading to the fourway valve D' in the duplicate set of pipes, is brought into communication by the groove 130 with the pipe 132 which leads to the pilot valve N. A second passageway controlled by spring-pressed valve 160 connects pipe 131 with the groove 130. The pipe 123 also leads to this pilot valve and there are pipes 133 and 134 connected with the pilot valve N. This pilot valve N is controlled by the ladle controlling piston and cylinder 50 and 51 and is provided with a rotatable control member 135, see Figs. 10 and 11. When the member 135 is in the position shown in Fig. 11, pipes 123 and 133 are in communication and pipes 132 and 134 are in communication. When the control member 135 is moved a proper distance, these pipes are disconnected and the pipe 133 is connected with the pipe 132 by means of the passageways 136, N² and N³, and the pipe 123 is connected with the pipe 134 by means of the passageways 137, N⁴ and N⁵. This control member 135 is rotated by the movement of the piston rod 52 which carries the members 139 and 140 which engage the members 141 and 142 attached to the control member 135. The pipe 134 leads to the tank 53. The pipe 133 connects with the pipe 143 which connects at one end with pipe 78 leading to the control valve A, and at the other end with the pilot valve N'. This pilot valve N' is similar to the pilot valve and N I have applied the same reference numerals thereto with the exponent a. From the pilot valve N' pipes 132a and 123a lead to the time delay valve M' and pipe 134a leads to pipe 134 and thence to the tank 53. A pipe 144 connects the time delay valve M' with the end of the four-way valve D. The time delay valve M' is similar to the time delay valve M and I have applied similar reference numerals thereto with the exponent a.

The pilot valve N' is similar to the pilot valve N and is operated in a similar manner by a member 145 connected with the pistons 45 and 48 which are used to introduce the charge of metal into the mold. This member is provided with actuating parts 146 and 147 which successively engage the members 148 and 149 connected with the rotating part of the pilot valve. The members 148 and 149 are in different vertical planes so that neither of the members 147 and 146 will strike both of them. When the parts are in the position shown in Figs. 7, 9 and 12, the pipe 132a is connected with the pipe 134a and the pipe 123a is connected with the pipe 143, see Fig. 12. When the engaging member 146 engages the member 149, so as to move the rotating valve member, this member is so moved that the port 150 will connect pipes 132a and 143 and the port 151 will connect pipes 134a and 123a.

As before stated, with this apparatus the action of the parts is automatic through the entire cycle. In Fig. 13 I have illustrated a diagram showing the cycle of operations when the particular automatic apparatus herein shown is used. It is of course evident that other automatic apparatus might be substituted and that this apparatus might be modified and changed in many particulars. This diagram is simply for the purpose of giving a quick visual representation of the cycle of operation and the time occupied for the different steps in this cycle of operation. In this diagram, for example, the time of starting to close the mold is represented at the top by the word "Start." The closing period for the mold in the particular apparatus herein shown is 18.5% of the entire cycle. The dumping period, that is the period used in dumping the metal from the ladle, is 9.2%. The precasting dwell, that is the pause between the dumping and casting, is 18.5%. The casting period is 9.2%. The period occupied by the final step, that is the increasing pressure on the molten metal in the casting at the end, is 1.1%. The post casting dwell when the mold is held closed and the metal cooling, is 25.0% and the knockout of the casting and the return of the mold section to its open position is 18.5%.

I will now describe the operation of the automatic hydrostatic operating mechanism for the parts and will begin this description when the mold controlling pistons and mechanism and the mold charging pistons and mechanism are in their retracted positions, the mold controlling pistons 31 and 29 being in the right end of their cylinders and the mold charging pistons 45 and 48 being in the left end of their cylinders. The motor 56 is started, which in turn starts pumps 54 and 55. The lever on control valve A is then shifted in the direction of the dart or arrow, thereby connecting pipes 78 and 86, see Figs. 7 and 8. Liquid pressure is then directed from pipes 61 and 76 of relief valve B to the following, from port 76 through pipe 78, control valve A and pipe 86 to pipe 87 connecting with four-way valve D, moving the valve piston to connect pipes 61 and 64. The liquid pressure is then directed from pipe 61 through valve D to pipe 64 and pipe 63 and into the cylinder at the right of piston 31 and also through pipe 65 to bypass valve E. Liquid pressure is then directed from pipe 76 through pipe 143 to pilot valve N' and then through pipe 123a to time delay valve M', shifting valve piston to close pipe 132a. Liquid pressure is then directed from pipe 76 through pipe 143 and pipe 133 through pilot valve N, then through pipe 123 to valve M, shifting valve piston to close pipe 132. The liquid then passes through pipe 119, through timing valve O', and then through pipe 118 to four-way valve D', shifting valve piston to connect pipes 61a and 62a, to direct liquid pressure into cylinder 46. This returns pistons 45 and 48 to their starting positions to insert the charge into the mold. The shifting of both valves M and M' is delayed by check valves 125 and 160, and 125a and 160a, as clearly shown in Fig. 9.

The liquid from pipe 63 entering die cylinder 32, moves die pistons 31 and 29 to the left, which causes the liquid in front of the piston 29 to pass through pipes 69 and 70, check-way valve F and pipe 71 into cylinder 28 back of piston 29. At the same time, liquid is being returned to tank 53 from die cylinder 32 through pipe 62, bypass valve D and pipes 66, 67 and 68. Liquid is also being returned through valve D pipes 66, 67 and 68 leading to tank 53 through pipe 144, time delay valve M', pipe 132a, pipes 134a and 102a, the check-valve in valve M' delaying the shift of the valve piston to allow return liquid to pass through pipes 132a and 144. Liquid pressure from pump 55 and through pipes 60 and 61, valve D and pipe 64 passes through bypass valve E and through pipe 72 to cylinder 28. Liquid pressure also passes through pipe 114 under piston 111, closing valve member 112 of check-way valve F. The die piston has now completed its leftward motion to close the die and is under pressure awaiting the function of dumping the metal from the ladle. When in this position, the member 93 engages the members 152 and 153 of valves O' and J, see Figs. 7 and 9, moving the pistons therein. The movement of the piston of valve O' connects pipe 118 of valve D' to pipes 115 and 102, to drain liquid from valve D'. The movement of the piston of valve J connects pipes 73 and 74 with the ladle controlling cylinder 50 and the piston 51, moving the piston rod 52 attached to the ladle 16, to move the ladle and discharge molten metal into the nozzle 8, see Fig. 2. Near the end of the upward stroke, actuating member 140 shifts lever 141 on valve N, which directs liquid pressure through pipe 133, valve N and pipe 132 to valve M, see Figs. 7, 9 and 10. Liquid is now being returned to the tank 53 through pipes 123, valve N and pipe 134. After all the liquid has been drained, pipes 132 and 131 connected with valve M' are connected, carrying the liquid pressure to the end of four-way valve D'. Ladle controlling piston 51 remains in its upward position.

The liquid pressure from pipe 131 shifts the valve member of four-way valve D' to the right and directs liquid pressure from pump 54 through pipe 61a, pipe 64a and pipe 63a into cylinder 46. Liquid pressure is also directed through pipe 65a to valve E'. The pistons 45 and 48 are now moving to the right, caused by the liquid entering by the pipe 63a. At the same time, movement of piston 48 causes liquid to be drawn from cylinder 49 in front of the piston through pipe 70a, valve F' and pipe 71a into the cylinder 49 back of the piston 48. Additional liquid is being drawn from the tank 53 through pipes 69a and 67a, to completely fill the cylinder 49. The movement of these pistons to the right disengages the member 154 of valve O and its piston moves upwardly, see Fig. 9, thereby disconnecting the pipe 155 leading to pipe 63a and pipe 156 leading to check-valve B'. Liquid is also now being returned from cylinder 46 through pipe 62a through the valve D', pipe 66a, pipe 67a and pipe 68a to the tank 53. Liquid from pipes 64a and 65a passes through bypass valve E' and then through pipe 72a into the cylinder 49 at the left of piston 48. Liquid also passes from pipe 72a through pipe 114a into valve F' below piston 111a, closing valve member 112a. The mold charging pistons 45 and 48 have now completed their motion to the right and the plunger 22 has moved the charge of molten metal from the nozzle 23 into the mold, see Fig. 2.

Just before the dwelling point of pistons 45 and 48, engaging member 146 shifts member 149 on pilot valve N', thereby directing liquid through pipe 143, valve N' and pipe 132a to valve M'. At the same time, liquid is being returned from valve M' through pipe 123a, valve N', pipe 134a and pipe 102a to the tank. After all the liquid has been drained from valve M', pipes 132a and 144 connecting with valve M' are connected, directing liquid pressure into the end of four-way valve D. This shifts the piston of this valve to the right. This connects pipes 61 and 62, directing liquid from the pump 55 into the die cylinder 32, starting the return motion of the die pistons. Liquid passes through pipe 110 into valve F above piston 111, moving it to open the valve member 112. The movement to the right of piston 31 moves member 93 to release member 153 of valve J and this disconnects pipes 73 and 74, see Fig. 9. This movement also releases the member 152 of valve O' and this connects pipes 118 and 119. Also liquid passes from pipe 62 through pipe 75 to ladle controlling cylinder 50 which starts the piston 51 on its return movement to move the ladle back into the pot 9. The liquid returns to the tank 53 from the cylinder 50 by passing through pipe 74 and passageway 74b in valve J and check valve 74c and passageway 74d. Liquid is being returned to the die cylinder 28 to the left of piston 29 through pipe 71, valve F and pipe 70 and a portion of this liquid is returned to the tank 53 through pipes 69, 67 and 68. Liquid is also returned to the tank from the die cylinder 32 through pipes 63 and 64, valve D and pipes 66, 67 and 68. Liquid returns to the tank 53 from valve D through pipes 87, 88, control valve A, pipes 83 and 102. At the end of the return stroke of die pistons 31 and 29, member 93 connected with said pistons, engages member 95 on valve O² so as to move the cylinder of this valve and connect pipe 86 to pipe 97 leading to relief valve B. Inasmuch as relief valve B has been vented through valve O², the pilot pressure necessary to return valves M and M' comes from relief valve B' through pipes 76a, 143 and 133 to valves M and M'. The return of mold charging pistons 45 and 48 starts just before the completion of the return stroke of ladle controlling piston 51.

Engaging member 139 shifts member 142 on valve N, moving said valve to connect pipes 123 and 133, directing liquid from pipe 133 into the passageway 124 of valve M, resetting the time delay valve M. The liquid also passes through pipe 119, valve O' and pipe 118 to the end of valve D'. This liquid shifts the piston of valve D' connecting pipes 61a and 62a, permitting the liquid from the pump 54 to enter the die charging cylinder 46 and cause the piston 45 to move to the left. Liquid passes through pipe 110a from pipe 62a into the valve F above piston 111a and moves this piston to open valve 112a. Liquid is now being returned to the tank 53 from cylinder 46 through pipes 63a, 64a, valve D', pipes 66a, 67a, and 68a. Liquid is also returned from valve D', when the piston moves to the left, to the tank 53 through pipe 131, valve M, pipe 132, valve N, pipe 134 and pipe 102a.

Liquid from cylinder 49 passes through pipe 71a, valve F' and pipe 70a to the cylinder 49 on the other side of the piston 48 and the excess liquid passes through pipe 69a, pipe 67a and pipe 68a back to the tank 53. Near the end of the return stroke of die charging piston 45, member 147 on member 145, connected therewith, shifts the member 148 of valve N' connecting pipes 143 and 123, and the liquid passing from pipe 123 to the delay valve M' moves its piston to reset it. At the end of the return stroke of the mold charging pistons, the member 145 engages the member 154 of valve O so as to move said valve to its open position, connecting pipes 156 and 155, venting relief valve B'. In the meantime, the connection between pipes 97 and 102 through valve O² has been closed. Also the control handle 80b on control valve A has returned to its former position by means of the pressure of the liquid or by means of the spring 80c, see Fig. 7.

It will be noted that in this process and apparatus the molten metal in measured quantities is placed in proximity to the mold by gravity and it is not until it is in position and substantially at rest, that pressure is applied to the molten metal to force it into the forming device or mold. It will further be seen that this molten metal is brought into proximity to the mold without being under pressure and comes to rest without being under pressure and that then the pressure to force it into the forming device is applied to it. It will also be noted that molten metal is received in a portion of the mold or forming device before pressure is applied to it, to force it into the metal receiving chamber which shapes it. There is here provided a nozzle and a passageway in the mold of substantially the same cross-sectional area and this nozzle and passageway are completely filled with molten metal by gravity. Furthermore, this nozzle and passageway in the forming device are both completely filled with the molten metal before the pressure which forces the metal into the metal receiving chamber is applied. In this construction the molten metal is moved first in a generally vertical direction, and by this I mean a direction sufficiently related to the vertical that gravity will move the metal, and then in a generally horizontal direction to bring it into position to be forced into the molding cavity of the mold. When the measured charge is used, so as to completely fill the nozzle and the communicating passageway in the mold, this metal is traveling at a comparatively slow speed and fills the nozzle and this passageway from the bottom up, thus giving the air a chance to escape, and substantially no air is entrapped in the nozzle and in the passageway of the mold in alignment therewith.

The molten metal after being deposited in the nozzle and the passageway in the mold, comes to rest before pressure is applied to it and this insures the escape of all entrapped gases and at the same time insures the easy, steady, flow without turbulence, of the molten metal into the molding cavity of the forming device so that there will be no splashing or agitation which would cause the molten metal to partially or wholly close the vent through which the air in the metal receiving cavity is discharged. It will thus be seen that under these conditions when the pressure is applied to the molten metal, this molten metal, free from air, is forced into the metal receiving chamber where it is shaped, free from air or other gases, so as to be free from porosity.

When the automatic mechanism is used for operating the device, the various valves and constructions are arranged so as to provide the proper delays at the proper points without the intervention of any mechanism other than the automatic mechanism. This permits the pre-casting dwell of the desired length while the molten metal is in the nozzle and the enlarged passageway in the mold, which is an important factor, and it also permits the post-casting dwell, that is, a sufficient delay after the metal has been forced into the mold to permit the metal to cool so that by the next action of the apparatus the mold members are separated and the casting removed therefrom.

In this device it will be noted that there is a charging chamber wherein the charge of molten metal for the mold is received, the charge of metal displacing the air from the charging chamber, the charge coming substantially to a stop in this charging chamber, and then the pressure device is applied to the charge so as to move it into the mold free of entrapped gases.

I claim:

An apparatus for forming die castings comprising a forming device, means for forming the molten metal into a measured quantity, a horizontally extending cylindrical member into which said measured quantity is received and which brings the molten metal to rest and forms it into a complete cylinder, a plunger engaging the end of said cylinder of molten metal, a power actuated means for moving said plunger to force the cylinder of molten metal toward the forming device without changing its cross sectional area until it reaches the forming device, means associated with the forming device for changing the direction of the molten metal as it enters the forming device, into a vertical direction, said power actuated means slowing up the movement of the molten metal, to cause it to enter the forming device free of turbulence and move the air in the forming device before it without mixing with this air, an air escape device at the topmost portion of the forming device through which the air escapes so that the forming device is completely filled with molten metal, and an additional power actuated means for applying increased pressure to said plunger to cause it to apply additional pressure to said molten metal after the forming device is completely filled therewith.

WILLIAM TANN.